United States Patent
Mogas et al.

(10) Patent No.: US 7,219,877 B1
(45) Date of Patent: May 22, 2007

(54) CONTINUOUS CATALYST EXTRACTION VALVE WITH LINE CLEANING FEATURE

(75) Inventors: Matthew L. Mogas, Houston, TX (US); John B. Williams, Jr., Houston, TX (US)

(73) Assignee: Mogas, Inc., Houston, TX (US)

(*) Notice: Subject to any disclaimer, the term of this patent is extended or adjusted under 35 U.S.C. 154(b) by 56 days.

(21) Appl. No.: 10/906,905

(22) Filed: Mar. 11, 2005

Related U.S. Application Data

(60) Provisional application No. 60/521,206, filed on Mar. 11, 2004.

(51) Int. Cl.
*F10K 5/10* (2006.01)

(52) U.S. Cl. .................. 251/207; 137/625.47

(58) Field of Classification Search ........... 137/625.47; 251/207
See application file for complete search history.

(56) References Cited

U.S. PATENT DOCUMENTS

| | | | |
|---|---|---|---|
| 2,621,012 A * | 12/1952 | Graham ................. 251/207 |
| 3,386,461 A | 6/1968 | Fisher ................... 137/237 |
| 3,542,338 A | 11/1970 | Scaramucci ............ 251/209 |
| 3,707,161 A | 12/1972 | Crawford .............. 137/269 |
| 3,794,071 A | 2/1974 | Scott .................. 137/599.2 |
| 3,985,150 A | 10/1976 | Kindersley ............ 137/240 |
| 4,130,128 A * | 12/1978 | Kaneko ................ 251/207 |
| 5,205,533 A | 4/1993 | Berchem ............... 251/118 |
| 5,551,467 A | 9/1996 | Booth et al. .......... 137/1 |
| 5,593,135 A | 1/1997 | Lester et al. .......... 251/209 |
| 5,937,890 A | 8/1999 | Marandi ............... 137/271 |
| 6,260,820 B1 | 7/2001 | Chowdhury ........... 251/287 |
| 6,412,756 B1 | 7/2002 | Hayduk ................ 251/315.1 |
| 6,540,206 B2 | 4/2003 | Guerra ................. 251/288 |
| 2003/0141480 A1 | 7/2003 | Green et al. .......... 251/315.01 |
| 2003/0205688 A1 | 11/2003 | Milberger et al. ..... 251/315.01 |

* cited by examiner

*Primary Examiner*—John Fox
(74) *Attorney, Agent, or Firm*—Daniel N. Lundeen; Lundeen & Dickinson, LLP

(57) ABSTRACT

A ball valve apparatus 10 for clearing an obstruction in a conduit is disclosed. The ball valve apparatus 10 incorporates a wear resistant choke tube 42 in the downstream opening 40B of the ball 36. The choke tube 42 can be two to four times smaller than the opening 40A on the upstream side of the ball 36. Removal of catalyst through the choke tube results in lower velocity of the flow through the bore of the valve, thereby reducing wear and erosion. In normal operation in an FCC unit, catalyst is extracted from the system through the choke tube 42. When the conduit becomes plugged, the ball valve apparatus 10 can be cycled into a fully opened position, thereby creating a high flow rate of fluid through the conduit, removing any existing obstructions.

11 Claims, 3 Drawing Sheets

CONTINUOUS CATALYST EXTRACTION VALVE WITH LINE CLEANING FEATURE

CROSS-REFERENCE TO RELATED APPLICATIONS

This application claims priority benefit of co-pending U.S. Provisional Patent Application No. 60/521,206, filed Mar. 11, 2004.

BACKGROUND OF THE INVENTION

The present invention relates to a ball valve and method for dumping catalyst fines from a catalyst regenerator such as in the fluidized catalyst cracking (FCC) units of refineries.

In a refinery reactor operating at elevated temperatures and pressures, catalyst is used in the preparation of useable hydrocarbon molecules. Specifically, the catalyst helps to break down larger hydrocarbon molecules into smaller hydrocarbon molecules, thereby producing "lighter" hydrocarbons for further processing. Over time, catalyst in FCC units becomes coated with carbon (also known as coke) and ceases to efficiently break down the larger hydrocarbon molecules. The coked catalyst is transported to a regenerator reactor where it is heated with oxygen to burn off the coke and regenerate the catalyst. During normal operation and regeneration, some catalyst is broken into smaller particles, known as fines, and must be periodically replaced. A discharge piping system is used to dump the catalyst fines. The ball valve and method of the present invention can be used with such a piping system.

Extraction of catalyst fines has been performed using wear resistant choke tubes of a specific size selected to establish proper flow rates for the process requirements. The tube periodically plugs up with solids, requiring the line to be isolated and the tube removed and cleaned. Isolation is achieved by closing the upstream block valves, resulting in plant down time as well as added maintenance expenses.

An alternate approach has been to use a valve in place of the choke tube, and to throttle and control the flow of catalyst with the valve. This system has the advantage of having the capability for adjusting the flow, however the internals of the throttling valve wear rapidly and are expensive to replace.

Fisher (U.S. Pat. No. 3,386,461) discloses a multi-port orifice valve, adapted for cleaning of the bores of the valve, that uses interchangeable inserts which may be placed within the bore of the valve. The valve body features four apertures (two per side), positioned to allow servicing (cleaning of the bore as well as removal and reinsertion of orifice inserts) while the particular bore is in the closed position, without having to shut down the line and remove the valve.

Crawford (U.S. Pat. No. 3,707,161) discloses a ball valve wherein the ball has a removable insert threadedly engaged within the flow passage. Also disclosed is an alternate embodiment in which the opening for the inserted choke tube is adjustable, accomplished with a threaded stem located at the bottom of the valve body.

Kindersley (U.S. Pat. No. 3,985,150) discloses a valve assembly for use with abrasive fluids wherein the valve bore has an abrasion resistant insert. The inserts may comprise ceramics (aluminum oxide, silicon carbide, boron carbide), metals (chrome alloys), rubber, or synthetic plastics (urethanes). Throttling the valve is achieved by rotating the ball, producing a reduced bore opening.

Marandi (U.S. Pat. No. 5,937,890) discloses ball valve inserts for controlling fluid flow. The inserts are preferably parabolic (convex) in shape, corresponding to the shape of the ball, providing a substantially equal percentage flow characteristic between maximum and minimum flow rate conditions. The parabolic shape of the insert compensates for the arcuate or non-linear path traveled by the insert during throttling.

Green (U.S. patent application Ser. No. 10/352,329) discloses a ball valve adapted to receive threaded inserts which may be secured to the valve by various means, including a retaining ring, press fitting, gluing, soldering, or threads. The combination of the standard ball valve and the inserts provide an infinite range of valve flow coefficients that are lower than the valve's maximum rated flow coefficient, depending on the diameter of the orifice. A disclosed advantage is stated as being retrofittable, although this requires removing the valve, selecting and inserting the desired insert for a desired flow coefficient, and reinserting the valve in the line.

Scaramucci (U.S. Pat. No. 3,542,338) discloses a ball valve adapted for throttling having a bore treated or lined with an erosion resistant material. Scott (U.S. Pat. No. 3,794,071) discloses a brake control valve device, wherein the device is equipped with a choke. Berchem (U.S. Pat. No. 5,205,533) discloses a ball valve having a ceramic coated passage and a restriction within the ball, wherein the bore within the ball narrows, producing a larger outlet bore diameter than the inlet bore.

Booth et al. (U.S. Pat. No. 5,551,467) and Lester et al (U.S. Pat. No. 5,593,135) disclose ball valves for precise throttling of fluid through the valve, achieving near linear performance in controlling the flow of the fluid. Chowdhury (U.S. Pat. No. 6,260,820) discloses a valve and method for producing the valve. Hayduk (U.S. Pat. No. 6,412,756) discloses a gas tight ball valve for use with granular material.

Guerra (U.S. Pat. No. 6,540,206) discloses a bi-directional ball valve for use with cold gases, featuring a through hole on its side surface, which in the closed position is available for the passage of fluid. The hole appears to have a greatly reduced bore diameter as compared with the main flow path. Milberger et al. (U.S. patent application Ser. No. 10/137,219) disclose a ball valve for use in oil and gas production systems, having a vent bore for the venting of pressure.

SUMMARY OF THE INVENTION

The present invention is directed, in one embodiment, to providing a ball valve apparatus which can be useful for processing solids, such as the extraction of catalyst from a fluidized catalytic cracking (FCC) unit, more particularly for clearing obstructions located upstream of the ball valve apparatus. In a second embodiment, a method is provided for the extraction of catalyst from the regeneration unit of an FCC unit, utilizing the ball valve of the present invention.

The present invention provides a ball valve apparatus for the continuous extraction of catalyst. The ball valve apparatus includes: (a) a body member having an upstream inlet, a downstream outlet, and an interior chamber; (b) a ball member disposed in the interior chamber and rotatable about an axis with respect to the body member between first and second positions; (c) a first passage though the ball member axially aligned with the inlet and outlet when the ball member is rotated to the first position, wherein the first passage has a downstream cross-sectional flow area in a downstream portion of the passage that is less than an upstream cross-sectional flow area in an upstream portion of the passage; and (d) a second passage extending through the ball member transversely with respect to the first passage and axially aligned with the inlet and outlet when the ball member is rotated to the second position; wherein the second passage has a cross-sectional flow area larger than the upstream cross-sectional flow area of the first passage.

In one embodiment, the first and second passages can comprise bores. In another embodiment, the first bore can be perpendicular to the second bore. In another embodiment, the downstream diameter of the first bore can be formed by a removable insert in the downstream portion of the bore. The insert can be made of a wear resistant material, such as cobalt-chromium-tungsten alloys, ceramics, carbides, and the like.

The internal diameter of the insert, in one embodiment, can be between about 0.25 inches and about 2.0 inches. The upstream portion of the first bore can have an internal diameter between about 1.5 and about 5 times the internal diameter of the insert. In another embodiment, the reduced diameter of the downstream portion of the bore can be between about 0.5 inches and about 1.0 inches. The upstream diameter of the first bore can also be from about 2 to about 4 times the downstream diameter.

A second embodiment of the invention provides a method for the extraction of catalyst from a regeneration unit, the method comprising: (a) extracting catalyst through a conduit exiting a catalyst regeneration unit; (b) positioning a regenerator dump valve in the conduit; (c) positioning the ball valve apparatus described above in the conduit downstream the regenerator dump valve; (d) positioning an isolation valve in the conduit downstream the ball valve apparatus; (e) maintaining the ball valve apparatus in the first position for the extraction of catalyst; (f) cycling the ball valve apparatus to the second position to thereby clear upstream obstructions from the conduit; and (g) thereafter returning the ball valve apparatus to the first position. The method can be repeated until the insert becomes worn, after which the insert can be removed and replaced.

BRIEF DESCRIPTION OF THE DRAWINGS

FIG. 5 is a top perspective view of the ball member of the ball valve of FIGS. 1–4.

DETAILED DESCRIPTION

The present invention provides a ball valve that can incorporate a wear resistant choke tube in a central bore of the downstream ball surface operatively placed in the flow stream during catalyst removal. The valve of the present invention can allow for a continuous flow of fluids and solids as required for normal process operations. During normal operation in a process having solids flow, such as in a fluidized catalytic cracking unit, or FCCU, for example, the conduit upstream of the ball valve can become plugged with solids. When this occurs, the ball valve of the present invention can be rotated to a full open position, or blowdown position, thereby allowing the solids to be flushed from these critical areas, and continuous flow can be re-established.

Figure 1:
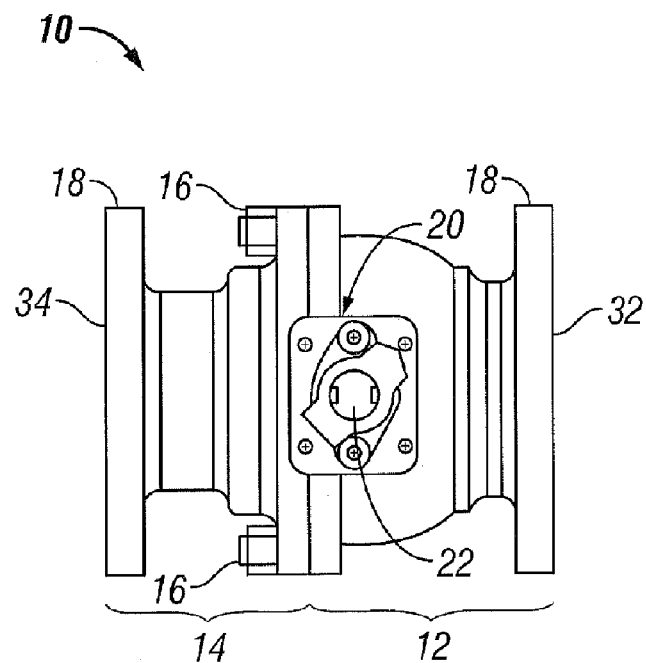
FIG. 1 is a top perspective view of the ball valve according to one embodiment of the present invention.
Figure 2:
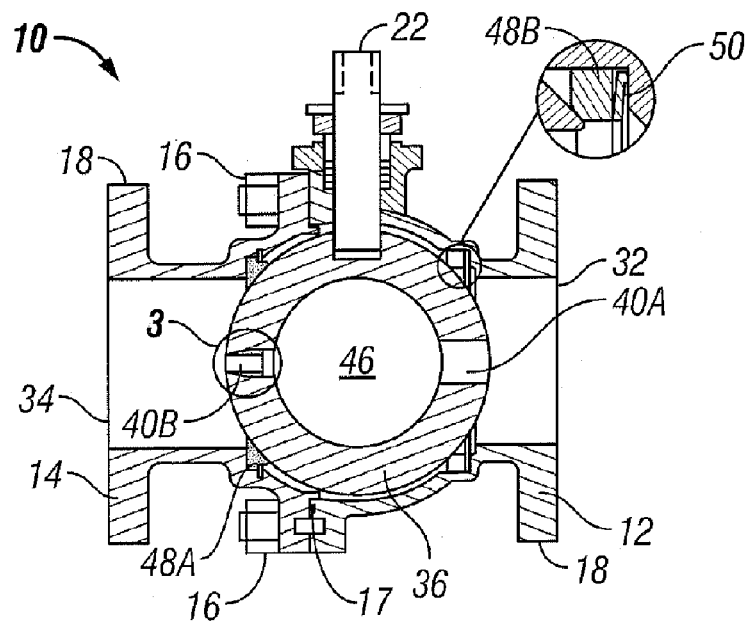
FIG. 2 is a side sectional view of the ball valve of FIG. 1.
Figure 3:
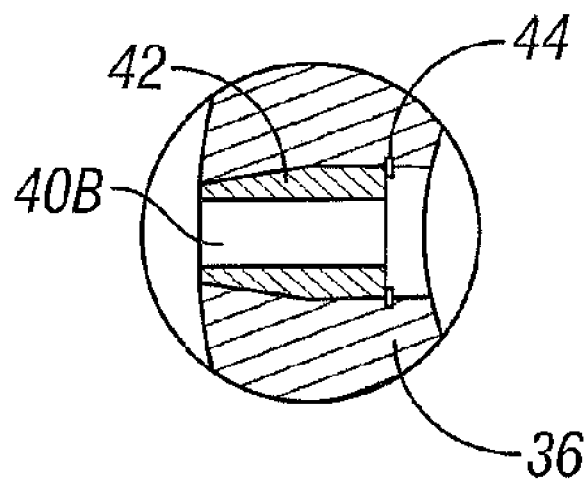
FIG. 3 is a detailed sectional view of the insert on the downstream side of the ball valve of FIGS. 1–2.
Figure 4:
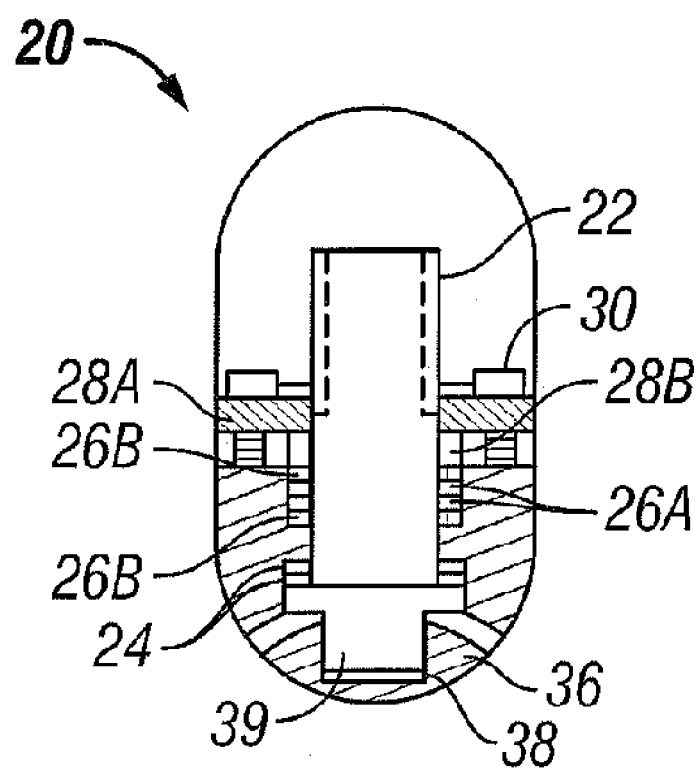
FIG. 4 is a detailed view, partly in section, of the stem portion of the ball valve of FIGS. 1–3.
Figure 6:
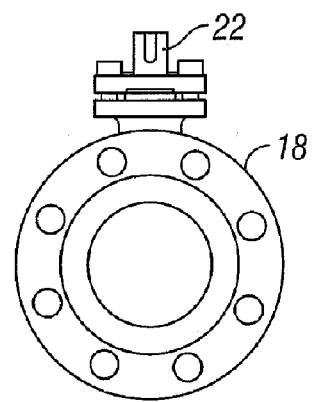
FIG. 6 is an end perspective view of the ball valve of FIGS. 1–5.

The ball valve 10 according to one embodiment of the present invention is depicted in FIGS. 1–6, where like parts are represented by like numerals. The valve body of ball valve 10 can be of two-piece construction from metal or other suitable material, having upstream body portion 12 and downstream body portion 14. Body portions 12 and 14 can be connected together with bolts 16, as illustrated in FIGS. 1–2. Gasket 17 can be used to form a seal along the adjoining surfaces of body portions 12 and 14. End connections 18 allow for connection of the valve 10 to upstream and downstream tubing, piping, or other processes (see FIG. 7, for example), and can be flanged or screwed type connections as are standard in the industry.

Ball valve 10 can have a stem portion 20 including stem 22, which can be conventionally adapted to connect to a valve handle or a valve positioner (not shown). Stem portion 20 can also include stem bearings 24, packing 26A and 26B, and glands 28A and 28B. Bolting 30 can secure stem portion 20 to upstream body portion 14, and can also be used to adjust glands 28A and 28B so as to ensure a good seal between the stem 22 and upstream body portion 14.

The upstream and downstream body members 12 and 14 can have bores 32 and 34 which can form a flow path (an inlet and outlet, respectively) through valve apparatus 10. When joined, body members 12 and 14 can form an interior chamber to receive spherical ball member 36. Seat rings 48A and 48B, in conjunction with spring 50, can form a seal between an outer surface of ball 36 and respective inner surfaces of body members 12, 14. Spherical ball member 36 can include stem connection detent 38 of a non-circular cross section to receive a distal end 39 of the stem 22 of matching geometry to operatively connect ball member 36 to stem 22 for rotation via the valve handle or other positioner.

Ball member 36 can have two flow paths which are transverse to each other, flow paths "A" and "B" as indicated on FIG. 5. Flow path "A" can be formed by first bore 40A/B, which can extend through ball member 36. Flow path "B" can be formed by second bore 46, intersecting perpendicularly with first bore 40A/B and extending through ball member 36. The flow direction of flow path "A" through first bore 40A/B can be determined by the respective locations of bores 40A and 40B, as bore 40B can be adapted to allow insertion of a wear resistant choke tube 42 in the center of the downstream side of the ball 36, as depicted in FIG. 5. If desired, an inside surface of the bore 40B and an outside surface of the choke tube 42 can be correspondingly inwardly tapered toward the downstream end to retain the choke tube 24 against fluid flow. Choke tube 42 can be held in place by snap ring 44 secured in a corresponding annular recess formed on an inside diameter of the bore 40B. Choke tube 42 may be constructed of a variety of wear and erosion resistant materials, including but not limited to, cobalt-chromium-tungsten alloys available under the trade designation STELLITE, for example; ceramics; carbides; and the like. The internal diameter of bore 40B and/or choke tube 42 can preferably be between ¼ and 2 inches in diameter, more preferably between ½ and 1 inch in diameter, and is typically sized for the specific application for which ball valve 10 is to be used.

Rotation of ball 36 ninety degrees cycles from a modified open, or metering, position (flow path "A") to a fully open, or blowdown, position adapted to clear upstream obstructions (flow path "B").

The upstream bore 40A of the modified position of the ball member 36 can have a larger opening than the downstream bore 40B, and can preferably be between 1.5 and 5 times larger than the downstream opening 40B, more preferably between 2 and 4 times the diameter of the downstream side 40B. The upstream diameter 40A of the modified open position can be smaller than the diameter of the fully open, or blowdown, bore 46. The larger opening 40A on the upstream side, and smaller opening 40B on the downstream side, can generally result in a lower inlet velocity of fluids and solids entering the ball 46, which in turn results in minimized wear in the bore 40A. In addition, due to lower wear and erosion and the fact that the downstream section 40B, where the fluids and solids are at a higher velocity, can be constructed of an erosion resistant material, the ball 36 can be fashioned from traditional materials without added abrasion resistance on bores 40A and 46 without negatively affecting the service life of the ball valve 10. The smaller opening 40B on the downstream side of the ball is designed to have a higher velocity and the major portion of the metering flow pressure loss in the system.

The ball valve 10 of the present invention can be used in many varied processes, and can be especially useful in processes involving solids flow. When the conduit, tubing, piping, or other orifices upstream of the ball valve 10 of the present invention become clogged during service, the obstructions can be cleared by cycling the ball 36 from the modified open position (flow path A) to the fully open position (flow path B), generating high pressure flow to wash through the ball 36 and remove existing obstructions. Once the conduit has been cleared, the ball 36 can be rotated to the original modified open position (flow path A) and normal, continuous solids flow can be restored.

Figure 7:
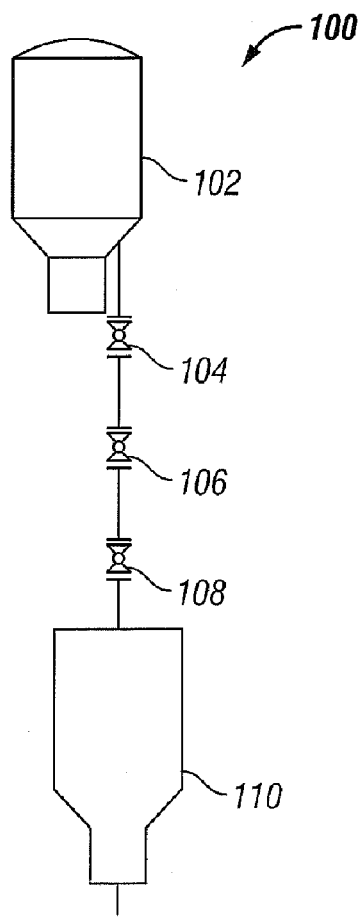
FIG. 7 is a schematic diagram of an FCC unit incorporating the ball valve member of FIGS. 1–6 according to one embodiment of the present invention.

For example, the ball valve of the present invention can be used in the continuous extraction of catalyst from an FCC unit, as shown in FIG. 7. The spent, or coked, catalyst of an FCC unit is regenerated in a regenerator 102, as is well known by those in the art. During regeneration, some catalyst breaks into smaller pieces, known as fines, which must periodically be removed from the system. The fines can pass through a regenerator dump valve 104, through the continuous catalyst extraction valve 106 of the present invention, through a catalyst isolation valve 108, to the spent catalyst hopper 110. Valves 104 and 108 described above can be ball or gate valves, but preferably the regenerator dump valve 104 is a ball valve, and the catalyst isolation valve 108 is preferably a gate valve. Generally, the continuous catalyst extraction valve 106 of the present invention can be one standard pipe size smaller than the upstream ball valve shown in FIG. 7. The upstream isolation ball valve is typically full bore. During normal operations, continuous catalyst extraction valve 106 will be in the metering position. If the piping upstream of the continuous catalyst extraction valve 106 of the present invention becomes clogged during service, the obstructions can be cleared by cycling the continuous catalyst extraction valve 106 from the metering or modified open position to the fully open position, generating a relatively high fluid flow rate to wash through the ball bore and remove existing obstructions. Once the conduit has been cleared, the continuous catalyst extraction valve 106 can be rotated back to the modified open position, and normal, continuous extraction of the catalyst can be restored.

It will be seen that a ball valve apparatus and method suitable for clearing upstream obstructions in the extraction of catalyst have been provided. The invention is described above in reference to specific embodiments for illustrative and non-limiting purposes. Various modifications and variations will occur to the skilled artisan in view thereof. It is intended that all such modifications and variations within the scope and spirit of the appended claims be embraced thereby.

What is claimed is:

1. A ball valve apparatus, comprising:
   a body member having an upstream inlet, a downstream outlet, and an interior chamber;
   a ball member disposed in the interior chamber and rotatable about an axis with respect to the body member between first and second positions;
   a first passage through the ball member axially aligned with the inlet and outlet when the ball member is rotated to the first position, wherein the first passage has a downstream cross-sectional flow area in a downstream portion of the passage that is less than an upstream cross-sectional flow area in an upstream portion of the passage;
   a second passage extending through the ball member transversely with respect to the first passage and axially aligned with the inlet and outlet when the ball member is rotated to the second position; wherein the second passage has a cross-sectional flow area larger than the upstream cross-sectional flow area of the first passage;
   wherein the downstream cross-sectional flow area of the first passage is formed by a removable insert in the downstream portion of the first passage; and
   an inside surface of the downstream portion of the first passage and an outside surface of the removable insert are correspondingly inwardly tapered toward a downstream end of the downstream portion of the first passage to retain the removable insert against fluid flow.

2. The ball valve apparatus of claim 1 wherein the first and second passages comprise bores.

3. The ball valve apparatus of claim 2 wherein the first bore is perpendicular to the second bore.

4. The ball valve apparatus of claim 2, wherein a downstream diameter of the first bore is formed by the removable insert in a downstream portion of the first bore.

5. The ball valve apparatus of claim 4 wherein the insert is made of a material more wear resistant than the ball member.

6. The ball valve apparatus of claim 5 wherein the wear resistant material is selected from the group consisting of cobalt-chromium-tungsten alloys, ceramics, and carbides.

7. The ball valve apparatus of claim 6 wherein an internal diameter of the insert is between about 0.25 and about 2.0 inches.

8. The ball valve apparatus of claim 2 wherein a diameter of a downstream portion of the first bore is between about 0.5 and about 1.0 inches.

9. The ball valve apparatus of claim 7 wherein an upstream portion of the first bore has an internal diameter between about 1.5 and about 5 times the internal diameter of the insert.

10. The ball valve apparatus of claim 8 wherein an upstream diameter of the first bore is from about 2 to about 4 times the downstream diameter.

11. The ball valve apparatus of claim 1 further comprising a snap ring secured in a corresponding annular recess formed in the inside surface of an upstream end of the downstream portion of the first passage.

* * * * *